United States Patent [19]

Shaw

[11] 4,189,059

[45] Feb. 19, 1980

[54] SEALING MECHANISM FOR AIRCRAFT FUEL TANK CAP

[75] Inventor: James R. Shaw, Amagansett, N.Y.

[73] Assignee: Shaw Aero Devices, Inc., East Hampton, N.Y.

[21] Appl. No.: 923,236

[22] Filed: Jul. 10, 1978

[51] Int. Cl.² ............................................. B65D 45/00
[52] U.S. Cl. .................................. 220/246; 220/251; 220/304
[58] Field of Search ............... 220/243, 246, 250, 251, 220/304, 293

[56] References Cited

U.S. PATENT DOCUMENTS

| | | | |
|---|---|---|---|
| 3,343,707 | 10/1965 | De Pew et al. | 220/246 |
| 3,476,285 | 11/1969 | De Pew | 220/246 |

Primary Examiner—George T. Hall
Attorney, Agent, or Firm—Pennie & Edmonds

[57] ABSTRACT

An improved filler cap for a tank having an opening defined by an annular wall of the type comprising (1) a plug member having an outwardly extending flange at its upper end and a lower end having a lower surface for contacting a sealing member disposed about the plug periphery, (2) a sealing member, and (3) a retaining member positioned below the sealing member for compressing the sealing member against the lower end of the plug member. In the improved cap, the surface of the lower end of the plug member and the upper surface of the retaining member define between them a first grooved portion for clinching the sealing member in position adjacent the plug periphery and a second radially inwardly disposed grooved portion of reduced cross section for accommodating fuel induced swelling or pressure induced deformation of the sealing member. With this improved structure, the cap can relieve pressure without interference from the sealing member, as the clinch groove restrains the sealing member from outward deformation and the accommodation groove receives the deformation radially inward.

10 Claims, 4 Drawing Figures

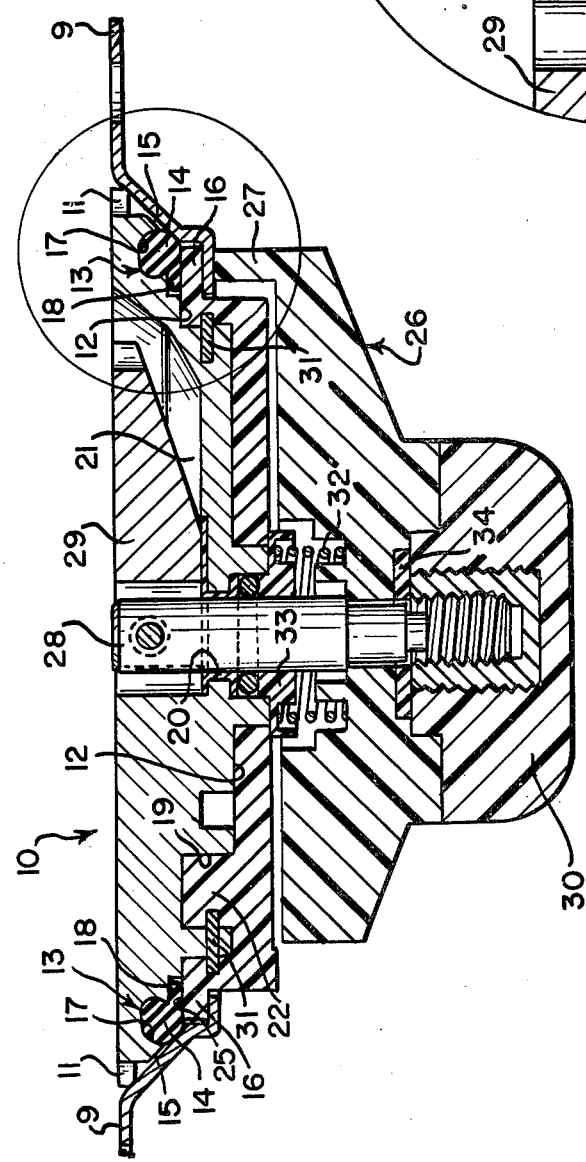
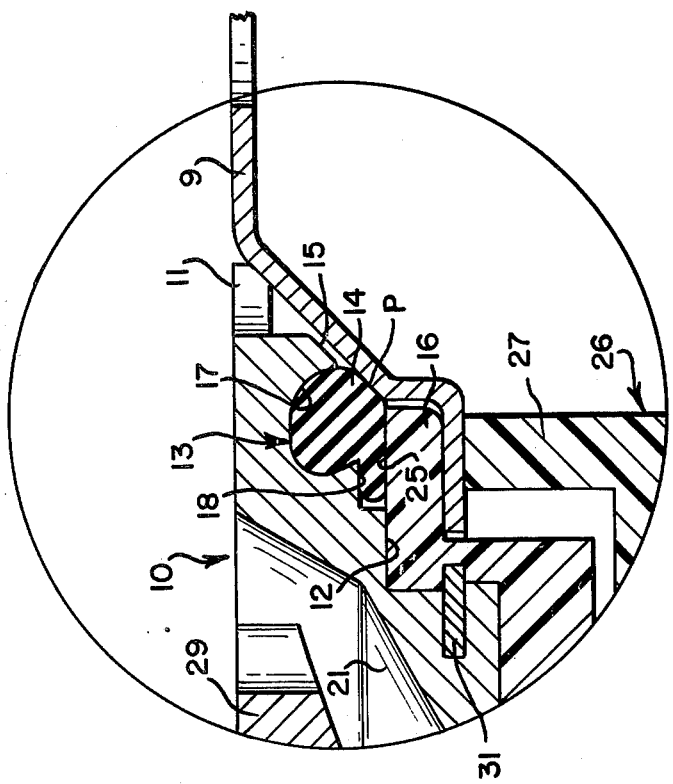

SEALING MECHANISM FOR AIRCRAFT FUEL TANK CAP

BACKGROUND OF THE INVENTION

1. Field of the Invention

This invention relates to filler caps for tanks and, in particular, to an improved cap for permitting pressure relief without interference from a deformed sealing member.

2. Desirable Features of a Tank Cap

In providing a filler cap for a tank, such as the gasoline tank of an airplane, it is desirable that the cap be manually operable so that it may be removed when refueling is necessary and also securely locked into the tank opening after refueling without necessitating the use of specialized tools. It is further desirable that the filler cap be constructed in such a way whereby visual observation of the cap will readily show whether it is properly locked into the tank. In addition, these caps have to be constructed to meet rigid specifications and standards. They must be able to withstand any internal pressure created within the tank, must not vibrate loose during use, and where the tank will contain explosive fumes such as created by high octane gasoline, it is of utmost importance that the filler cap be lightning safe, that is, immune to electrical sparking on the fuel side of the point of seal without adversely affecting the sealing function of the cap.

3. History of the Art

In the past, filler caps of this general type have been constructed with a plug member for effecting a seal with the tank opening and a cooperating locking mechanism depending therefrom for locking the cap onto the tank in a sealed position. A shaft extending through the plug member is attached at its lower end to the locking mechanism and provided at its upper end with an actuating handle adapted to be received within a handle recess formed in the upper surface of the plug member. Movement of the handle into and out of the recess will cause longitudinal movement of the locking mechanism relative to the plug member while rotation thereof about the axis of the shaft will move the locking mechanism from a first position in which the cap may be readily removed from the tank opening to a second position where the locking mechanism may be moved toward the plug member to securely lock the cap in sealed relationship within the opening.

For receiving caps of this construction, the tank is provided with an adapter member which defines the tank opening. This adapter is constructed with an annular wall surface extending into the tank for receiving the plug member and an annular locking flange at the bottom of the wall surface. The annular flange is provided with openings or slots for permitting the locking mechanism to pass beyond it when the cap is inserted into the adapter so that the locking mechanism may then be rotated about the axis of the plug and into a position under the flange whereby movement of the locking mechanism toward the plug member will cause it to engage against the undersurface of the flange and lock the cap in sealed position within the tank opening.

With filler caps of this construction, the sealing of the plug member against the annular wall of the adapter member is effected by means of an O-ring fixed to the outer surface of the plug member. This O-ring extends beyond the outer periphery of the plug member and effects a spacing of the upper surface of the plug member from the surrounding adapter member and tank wall. This spacing does not prevent a proper sealing of the cap but does expose the sealing O-ring to the ambient atmosphere rendering it more susceptible to deterioration and swelling. Also, by having the exposed outer surface of the cap spaced from the surrounding adapter and outer wall of the tank, a situation is created in which an electrical charge striking directly against the cap or passing from the outer wall surface of the tank onto the cap may tend to more readily pass through the cap and inwardly into the tank rather than across the cap and back onto the outer surface of the tank. It is apparent that any electrical charge entering the tank and creating internal sparking, where, for example, the tank contains gasoline, may cause the tank to explode.

To overcome these problems, the filler cap disclosed in U.S. Pat. No. 3,391,817 is constructed so that its exposed upper surface seats directly upon or almost touches the adapter defining the tank opening. In addition, the sealing of the cap within the tank opening is effected by a compressible seal in the form of an O-ring positioned in a groove about the periphery of the plug member. As the cap is lowered into the tank opening, this O-ring is deformed into positive engagement with the opposed annular wall portion of the adapter and the flange of the plug member is seated directly upon the end of the annular wall of the adapter. To activate the seal member, it is positioned on the plug member of the cap in alignment with a slanted portion of the adapter member so that insertion of the cap into the opening will cause the sealing member to engage against the annular wall surface of the adapter at this slanted portion. Alternatively, a compression plate may be attached to the bottom of the plug member and slidably received over its lower end whereby upon locking of the cap into the opening, such compression member will be drawn into engagement with the O-ring to compress it and thereby cause it to deform outwardly of the plug member and into engagement with the annular wall surface of the adapter. In these caps, the O-ring is substantially free of restraint against radially outward deformation.

While these caps have performed well in many applications for many years, in some instances they have failed to relieve internal vapor pressures generated in the tanks. Typically the caps are removed from the tank by first lifting a lever arm to decompress the O-ring and thus destroy the seal. Then the lever is rotated to unlock the cap from the adapter. In some instances, however, the O-ring is deformed radially outward by either tank pressure or fuel induced swelling with the consequence that decompression does not relieve the tank pressure. If the cap is then unlocked, it can pop out with considerable force.

Accordingly, there is a need for an improved filler cap which can reliably relieve internal tank pressures without interference from the sealing member.

SUMMARY OF THE INVENTION

In accordance with the present invention, an improved filler cap for a tank having an opening defined by an annular wall of the type comprising (1) a plug member having an outwardly extending flange at its upper end and a lower end having a contact surface for contacting a sealing member disposed about the plug periphery, (2) a sealing member, and (3) a retaining member positioned below the sealing member for compressing the sealing member against the lower end of the plug member. In the improved cap, the surface of the lower end of the plug member and the upper surface of the retaining member define between them a first grooved portion for clinching the sealing member in position adjacent the plug periphery and a second radially inwardly disposed grooved portion of reduced cross section for accommodating fuel induced swelling or pressure induced deformation of the sealing member. With this improved structure, the cap can relieve pressure without interference from the sealing member, as the clinch groove restrains radially the sealing member from outward deformation and the accommodation groove receives the deformation radially inward.

BRIEF DESCRIPTION OF THE DRAWINGS

The nature, advantages, and various features of the invention will appear more fully upon consideration of the illustrative embodiments now to be described in detail in connection with the accompanying drawings.

In the drawings:

FIG. 1 is a cross-sectional view of a filler cap in accordance with the invention shown in locked position within an adapter;

FIG. 2 is an enlarged portion of the filler cap of FIG. 1, illustrating the details of the O-ring seal;

For convenience of reference, the same structural elements are designated by the same reference numerals throughout the drawings.

DETAILED DESCRIPTION OF THE DRAWINGS

Figure 3:
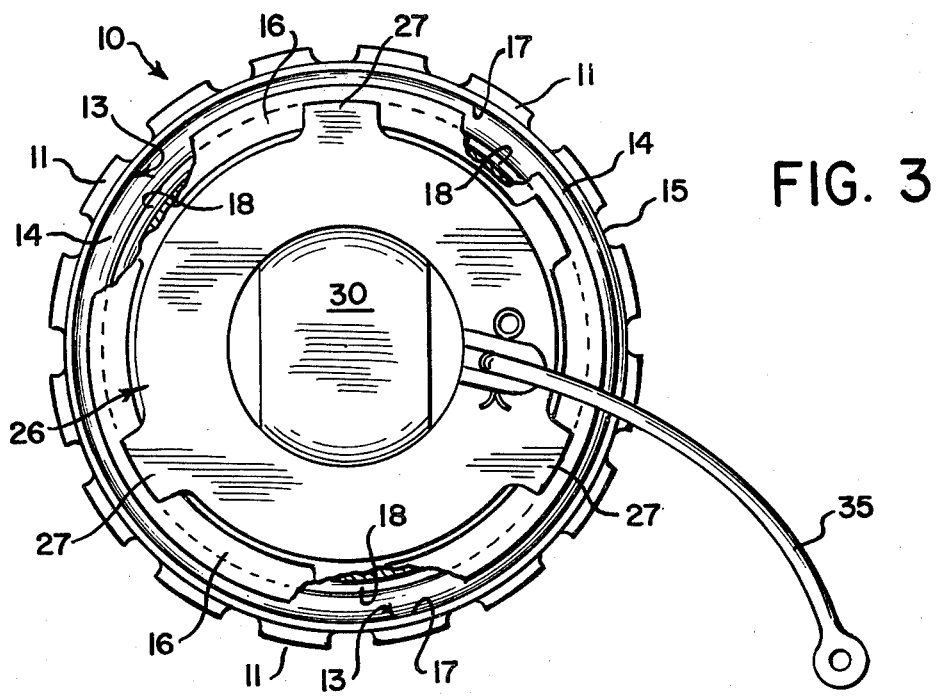
FIG. 3 is a plan view of the lower end of the filler cap shown in FIG. 1.
Figure 4:
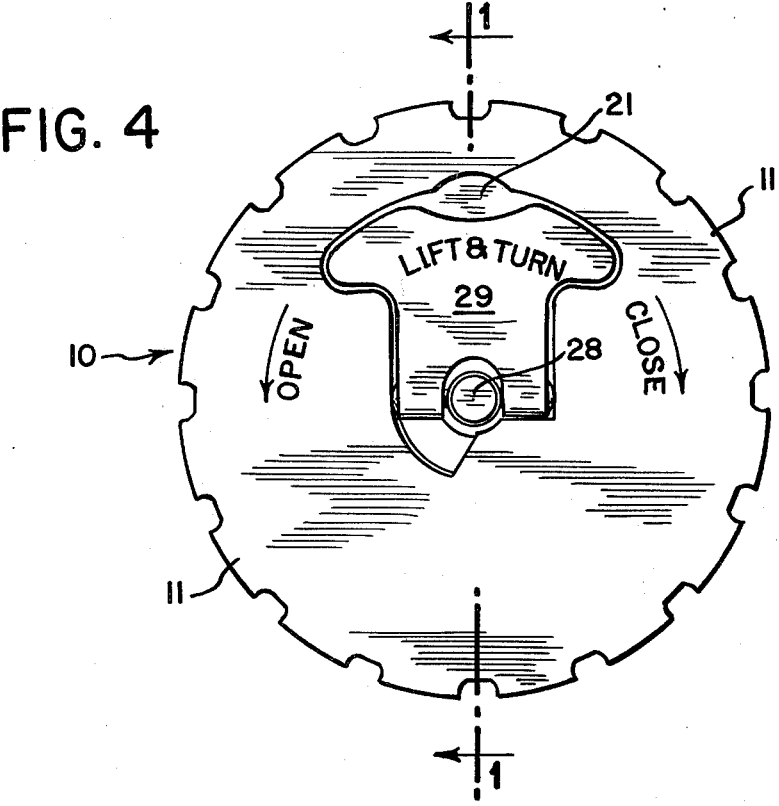
FIG. 4 is a plan view of the upper end.

Referring to the drawings, FIGS. 1-4 illustrate within an adapter 9, a filler cap in accordance with the invention comprising a plug member 10 having an outwardly extending flange 11 at its upper end and, at its lower end 12, a contact surface 13 for receiving and contacting a sealing member 14, such as an elastomeric O-ring, about the plug periphery 15. A retaining member 16 is positioned below the sealing member for compressing it against the lower end of the plug member. The grooved contact surface 13 of plug member 10 has a clinching groove portion 17 curved for clinching the sealing member in position adjacent plug periphery 15 and a second radially inwardly disposed accommodation groove portion 18 of reduced cross section for accommodating fuel induced swelling or tank pressure induced deformation of the sealing member 14. The clinching groove circumscribes the sealing member about a sufficient portion of its periphery that it restrains radially outward deformation of the sealing member. Preferably the groove circumscribes the sealing member about a major portion of its extent between the point of contact with the adapter wall P and the accommodation groove. The accommodation groove, which can be of substantially rectangular cross section, bears a sufficient ratio of volume per unit length to the volume per unit length of the O-ring that it can accommodate the maximum fuel induced swell of the sealing member. In a typical application involving the use of a conventional fluorinated silicone O-ring for aviation gasoline tanks, the accommodation groove has a volume per unit length of up to 20 percent of the sealing member volume per unit length. With this structure, the cap can relieve pressures of up to 40 lbs. per square inch without interference from a deformed sealing member, as the member is restrained against radially outward deformation by clinching groove 17 and the deformation is thus forced into accommodation groove 18.

Plug member 10, which can be constructed of a suitable conductive material such as die cast aluminum, is preferably provided with an aligning aperture 19 on lower end 12, and retaining member 16 is preferably provided with an alignment post 22 adaopted to be received within the aligning aperture 19. The upper outer surface of the retaining member provides an annular surface 25 facing contact surface 13 of the plug member. This annular surface holds the sealing ring 14 in position on the plug member.

Below the retaining member is located a locking member 26. This locking member is provided with a plurality of locking fingers 27, shown in FIG. 3, positioned radially outwardly of the member and extending in an upward direction toward the retaining and plug members of the cap.

The parts of the cap are connected together by means of an operating shaft 28. This shaft extends via central bore 20 from the handle recess 21 of the plug member through the retaining member and has a threaded portion extending beyond the lower end of the locking plate. An operating handle 29 is pivotally connected to the upper end of the operating shaft and is adapted to be received within the handle recess. In order to hold the parts of the cap on the shaft, a securing means in the form of a threaded locking cap 30 is threadedly engaged to the lower end of the operating shaft, and the plug is fastened to the retaining member by expanding ring 31.

A compression spring 32 is positioned in encircling relationship with respect to the shaft between the plug and the shaft so as to normally urge the locking plate away from the plug and retaining members.

As indicated above, all exposed parts of the cap disposed below the point of sealing to the adapter are constructed of or coated with non-conductive material or electrically isolated so that arcing will not occur. For this purpose, the retaining member is made of a suitable plastic such as that sold by E. I. duPont of Wilmington, Delaware, under the trade name Zytel 101. The locking plate, nut and retaining ring are preferably glass-filled nylon. Similarly, the locking cap is constructed of a threaded metal portion covered with non-conductive material such as Zytel 101. The operating shaft is constructed of stainless steel and, in order to isolate it and the compression spring from the interior of the tank as well as distribute the load over the locking plate, non-conductive washer 33 is positioned between the retaining member and locking plate in encircling relationship with the compression spring as shown in FIG. 1. This washer may be constructed of a suitable material such as nylon. Also, a similar washer 34 is positioned between the lower surface of the locking plate and the locking cap; and the locking cap when secured to the exposed lower end of the operating shaft seals against the lower surface of the locking plate and isolated the lower end of the operating shaft from the interior of the tank.

In operation, the shaft 28 is rotated about its own axis to bring the locking fingers into and out of alignment with the slots of the adapter member. When the locking fingers are brought into such alignment, the handle will be in a raised position and held in this position by the compression spring 32.

When it is desired to lock the cap in the tank opening, the handle is first rotated about the axis of the shaft to position the locking fingers under the inwardly directed flange of the adapter member 9. For permitting rotation of the locking plate, the portion of the shaft surrounded by the locking plate is flattened and received within a complementary-shaped slot in the locking plate. Next, the handle which is pivotally connected to the operating shaft is rotated about this pivotal connection and into the handle recess. This movement draws the fingers of the locking plate upwardly into engagement with the lower surface of the flange of the adapter and at the same time draws the plug member downwardly into the opening. Upon downward movement of the plug member into the opening, the sealing ring engages against the annular wall surface of the adapter along an inwardly and downwardly directed surface until the flange comes into direct contact with the upper end of the annular wall surface of the adapter.

It will be apparent from the above that removal of the cap from the tank will be effected by operating in the reverse manner from that described above. In order to prevent misplacement or loss of the cap when removed from the tank opening, it is preferably connected to the adapter member by a suitable lanyard 35. One end of the lanyard is connected to the adapter while the other end extends in sealing relationship through a slot in the locking cap and is connected to the lower end of the operating shaft. This lanyard is constructed of polyurethane or other non-conductive material.

While the invention has been described in connection with a small number of specific embodiments, it is to be understood that these are merely illustrative of the many other specific embodiments which can also utilize the principles of the invention. For example, while the clinching and swell-accommodation grooves have been shown located on the lower surface of plug member 10, they could alternatively be located on the upper surface of retaining member 16 or a swell-accommodation region can be otherwise formed adjacent the sealing member in any other conventional manner. Thus, numerous and varied devices can be made by those skilled in the art without departing from the spirit and scope of the present invention.

I claim:

1. An improved filler cap for a tank having an opening defined by an annular wall of the type comprising (1) a plug member having an outwardly extending flange at its upper end and a lower end having a contact surface for contacting a sealing member disposed about the plug periphery, (2) a sealing member, and (3) a retaining member positioned below the sealing member for compressing the sealing member against the lower end of the plug member, said filler cap characterized in that:
said contact surface of said plug member and said upper surface of said retaining member define between them a first grooved portion for clinching said sealing member in position adjacent the plug periphery and a second radially inwardly disposed grooved portion of reduced cross section for accommodating deformation of said sealing member, wherein said first grooved portion circumscribes a sufficient portion of the periphery of the sealing member to restrain radially outward deformation of said sealing member and thereby force such deformation into said second radially inwardly disposed grooved portion.

2. A filler cap according to claim 1 wherein said contact surface of said plug member comprises a first grooved portion shaped to define said first grooved portion for clinching said sealing member and a second grooved region for defining said second radially inwardly disposed grooved portion of reduced cross section.

3. A filler cap according to claim 1 wherein said second radially inwardly disposed grooved portion accommodates deformation of said sealing member due to fuel induced swelling or tank pressure induced deformation.

4. A filler cap according to claim 1 wherein said grooved portion for clinching said sealing member circumscribes the sealing member about a major portion of its extent between a point of contact with the adapter wall and said second grooved portion.

5. A filler cap according to claim 1 wherein said sealing member is comprised of elastomeric material.

6. A filler cap according to claim 1 wherein said sealing member comprises an O-ring member.

7. A filler cap according to claim 1 wherein said grooved portion of reduced cross section bears a sufficient ratio of volume per unit length to the volume per unit length of the sealing member that the filler cap can relieve tank pressures of up to 40 lbs. per square inch upon decompression of the sealing member.

8. A filler cap for a tank having an opening defined by an annular wall, said cap comprising:
a plug member having an outwardly extending flange at its upper end and a lower end having a grooved contact surface positioned about the periphery of said plug for clinching a sealing member;
an elastomeric sealing member retained about the periphery of said plug by said grooved contact surface;
a retaining member positioned below said sealing member for compressing said sealing member against the lower end of said plug member; and
formed adjacent said sealing member, an open region of reduced cross-sectional area for accommodating deformation of said sealing member due to fuel induced swelling or tank pressure induced deformation;
said grooved contact circumscribing a sufficient portion of the periphery of the sealing member to restrain radially outward deformation of said sealing member and thereby forcing such deformation into said second radially inwardly disposed grooved portion whereby said cap can relieve pressure without interference from a deformed sealing member.

9. A filler cap according to claim 8 wherein said grooved contact surface for clinching said sealing member circumscribes the sealing member about a major portion of its extent between a point of contact with the adapter wall and said second grooved portion.

10. A filler cap according to claim 8 wherein said grooved portion of reduced cross section bears a sufficient ratio of volume per unit length to the volume per unit length of the sealing member that the filler cap can relieve tank pressures of up to 40 lbs. per square inch upon decompression of the sealing member.

* * * * *